United States Patent [19]

Taylor

[11] Patent Number: 5,542,877
[45] Date of Patent: Aug. 6, 1996

[54] METHOD AND APPARATUS FOR EXTRACTING MEAT FROM CRAB CLAWS

[76] Inventor: George E. Taylor, P. O. Box 50, Stonewall, N.C. 28583

[21] Appl. No.: 239,881

[22] Filed: May 9, 1994

[51] Int. Cl.⁶ .................................................. A22C 29/00
[52] U.S. Cl. .................................................. 452/7; 452/1
[58] Field of Search .................................... 452/7, 1

[56] References Cited

U.S. PATENT DOCUMENTS

| | | |
|---|---|---|
| 2,784,447 | 3/1957 | Thompson et al. . |
| 3,022,175 | 2/1962 | Wakefield . |
| 3,135,992 | 6/1964 | Fredrickson . |
| 3,750,234 | 8/1973 | Rogers et al. . |
| 3,855,668 | 12/1974 | Wenstrom . |
| 4,003,103 | 1/1977 | Wenstrom et al. . |
| 4,021,886 | 5/1977 | Crepeau . |
| 4,124,902 | 11/1978 | Wentstrom et al. . |
| 4,316,306 | 2/1982 | Huebotter . |
| 4,321,730 | 3/1982 | Tolley et al. . |
| 4,535,507 | 8/1985 | Reinke . |
| 4,564,978 | 1/1986 | Reinke ........................... 452/7 |
| 4,752,988 | 6/1988 | Guglielmo et al. ........... 452/10 |
| 4,785,502 | 11/1988 | Howard . |

*Primary Examiner*—Willis Little
*Attorney, Agent, or Firm*—John G. Mills and Associates

[57] ABSTRACT

This invention is a means and method for mechanically removing the meat from crab claw pincers and their attached claw arms. This is accomplished by placing the claws on a conveyor and holding the same in position prior to and during cutting of the claw pincer jaw ends and attached claw arm body joint ends. The cut claws are placed in paired diverging openings in pads with the cut ends disposed downwardly. The pads are then conveyed into a vibratory meat extracter where the meat within the cut claws is extracted therefrom prior to removing the remains of the claws from the pad and returning such pad for reloading.

8 Claims, 4 Drawing Sheets

5,542,877

METHOD AND APPARATUS FOR EXTRACTING MEAT FROM CRAB CLAWS

FIELD OF INVENTION

This invention relates to seafood processing and more particularly to the extraction of meat from crab claws.

BACKGROUND OF INVENTION

The removal of meat from the bodies and appendages of crustaceans such as crabs have historically been accomplished by hand. This is particularly true in removing the meat from blue crabs found on the eastern seaboard of the United States which are considerably smaller than dungeness and snow crab found on the West Coast of the country.

Skilled workers, commonly referred to as crab pickers, work in crab houses picking the cooked crab meat from the bodies of the crabs. Machines and apparatuses have been developed to separate edible crab meat from nonedible portions of the crab body but almost invariably more fragments of crab shells are found in the meat following this process than is found in crab meat hand picked by crab pickers.

There is a considerable amount of meat in the bodies of East Coast blue crabs and is relatively easy to extract by hand. The claws of these crabs, however, are relatively small, certainly as compared to the claws of dungeness and snow crabs, and are hard and difficult to crack. For this reason, blue crab claws are quite often frozen and sold separately as hors d'oeuvres or the like due to the difficulty of extracting meat therefrom.

A number of machines and apparatuses have been developed for extracting meat from the appendages of crustaceans but a majority of these have been for removing the meat from the legs and claws of the large dungeness, snow and king crab, rather the much smaller pincer claws of the eastern blue crab. These various crab claw meat extracting apparatuses cut the shell or the entire claw to expose the meat in the interior of such claw. This cutting process is usually circumventially around the claw to separate one end from the other end or a transverse cut through the entire claw. In either case, rather large areas of claw shell are cut which greatly increases the chance of splintered shell or shell dust from contaminating the claw meat being extracted.

CONCISE EXPLANATION OF PRIOR ART

U.S. Pat. No. 4,785,502 to Howard discloses an apparatus for extracting the meat from crustacean appendages including the utilization of pressurized air injected into the appendage to expel the meat therefrom.

U.S. Pat. No. 4,021,886 to Crepeau discloses an apparatus for scoring crab claws circumventially so that one end of the shell can be separated from the other end. See particularly FIG. 5.

U.S. Pat. No. 3,135,992 to Fredrickson discloses a method of producing shelled crab claws including bisecting the shell of the bulb portion of a king crab claw longitudinally to expose the meat within the claw. See particularly FIG. 11.

U.S. Pat. No. 4,316,306 to Huebotter discloses a method and apparatus for holding the pincer carrying leg of a crab for splitting the leg and pincer longitudinally to expose the meat therein. See particularly FIG. 5.

U.S. Pat. No. 4,003,103 to Wenstrom et al discloses an apparatus for separating edible crab meat from nonedible body portions of cooked crabs after the top shell has been removed therefrom.

U.S. Pat. No. 4,124,920 discloses a method of separating edible crab meat from nonedible body portions of cooked crabs which is a division of U.S. Pat. No. 4,003,103 and is based on a continuation-in-part thereof.

U.S. Pat. No. 4,535,507 is a method and apparatus for removing lump meat from blue crabs including cutting the crabs so that they can be hand picked with a special tool.

U.S. Pat. No. 3,022,175 is a method of preparing king crab legs including freezing of the same and enclosing such legs in a moisture impervious sheet.

U.S. Pat. No. 2,784,447 is a crab cleaning machine for removing the top shells and gills of crabs and washing the same in an automatic operation.

U.S. Pat. No. 3,750,234 to Rodgers et al discloses a crab picking machine wherein cooked crabs are elevated and allowed to fall on a shaker screen wherein the fall impact breaks up the crabs allowing the parts to be separated.

U.S. Pat. No. 3,455,668 to Wenstrom discloses an apparatus for separating edible crab meat from nonedible portions from cooked crab bodies including violently impacting such crabs against a chamber wall.

Finally, U.S. Pat. No. 4,321,730 to Tolley et al discloses a core box supporting means for vibratory type processing machines where meat is removed from the body of crabs.

BRIEF DESCRIPTION OF INVENTION

After much research and study into the above-mentioned problems, the present invention has been developed to extract meat from crab claws in a highly-efficient manner while reducing to an absolute minimum the chance of pieces of shell contaminating such meat.

The above is accomplished by sizing the crab claws from which the meat is to be extracted, cutting the pincer end of the claws and the body joint end of the attached claw arm so that the interior of the claws and claw arms communicate with the exterior thereof, moving the thus prepared claws to an endless conveyor with inverted V-shape openings therein, holding the claws and attached arms on said conveyor and rapidly vibrating the same to remove the crab meat from the interior thereof, and discharging the empty shells from said conveyor.

The above is accomplished with a minimum of labor while removing larger amounts of meat than can ordinarily be removed by hand, with few or no pieces of shell contaminating the meat, in much less time than such process can be accomplished manually.

In view of the above, it is an object of the present invention to provide a highly-efficient means and method of extracting meat from crab claws.

Another object of the present invention is to provide a means and method of extracting meat from crab claws with a minimum amount of cutting of the claw shell.

Another object of the present invention is to provide a means and method of extracting meat from crab claws including cutting of the ends of the pincers of the claw and the end of the claw arm adjacent the body joint followed by placing the joined crab claw and arm in an inverted V holder and vibrating the same to remove the claw meat therefrom.

Another object of the present invention is to place a joined crab claw and arm on an inverted V in cross section holder with the knuckle joint therebetween being at the apex of the V and cutting the pincer end of the claw and the body joint end of the arm prior to vibrationally removing the meat from said claw and arm.

Other objects and advantages of the present invention will become apparent and obvious from a study of the following description and accompanying drawings which are merely illustrative of such invention.

DETAILED DESCRIPTION OF INVENTION

Figure 1:
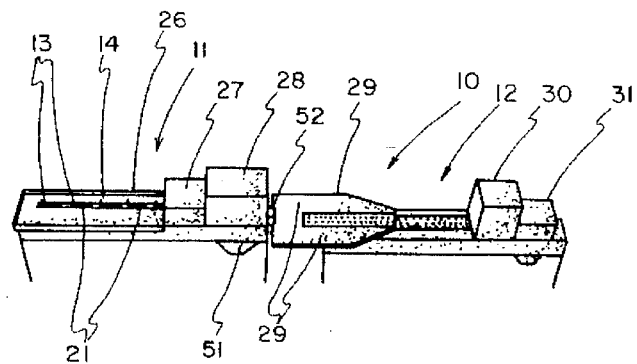
FIG. 1 is a perspective view of the crab claw meat extractor of the present invention.

With further reference to the drawings, the crab claw meat extractor of the present invention, indicated generally at 10, includes a crab claw cutting portion, indicated generally at 11 and a meat extraction portion, indicated generally at 12.

The crab cutting portion 11 includes work tables 13 on opposite sides thereof with a crab claw conveyor 14 therebetween.

The worktables 13 are provided at a convenient height that workers can take crab claws from the worktables 13 and place the same on the crab claw conveyor 14 as will hereinafter be described in greater detail.

The crab claw conveyor 14 includes a carrier chain 15 that is trained over sprockets 16 and 17, idler sprocket 18 and drive sprocket 19. Drive sprocket 19 is operatively attached to drive motor 20 in the normal manner. Since the operation of drive chains, sprockets and drive motors are well known to those skilled in the art, further detailed discussion of the same is not deemed necessary.

A plurality of crab claw carriers 21 are provided and are operatively mounted on drive chain 15. These crab claw carriers are inverted V-shaped in cross section with sloping sides 22 with a peak 23.

Figure 4:
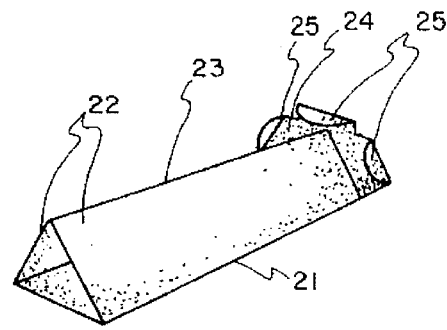
FIG. 4 is a top perspective view of the crab claw carrier.
Figure 5:
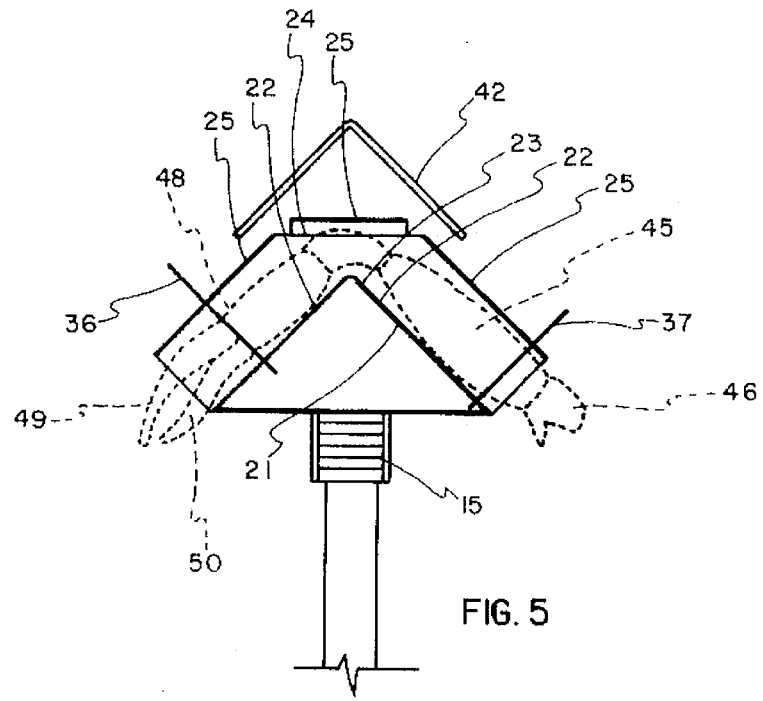
FIG. 5 is an enlarged sectional view of the crab claw carrier mounted on the chain drive of the claw conveyor.
Figure 6:
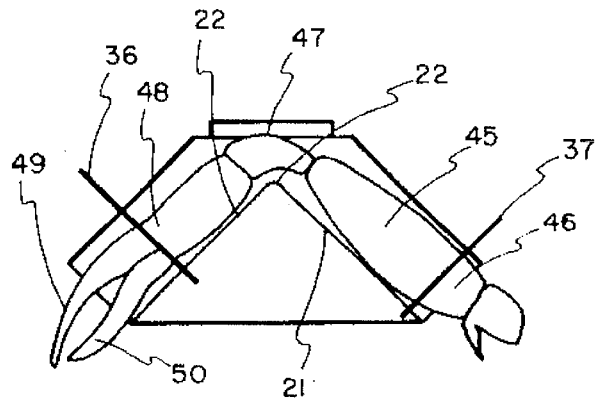
FIG. 6 is an elevational view of a crab claw including its pincer and claw arm disposed on the crab claw carrier.
Figure 7:
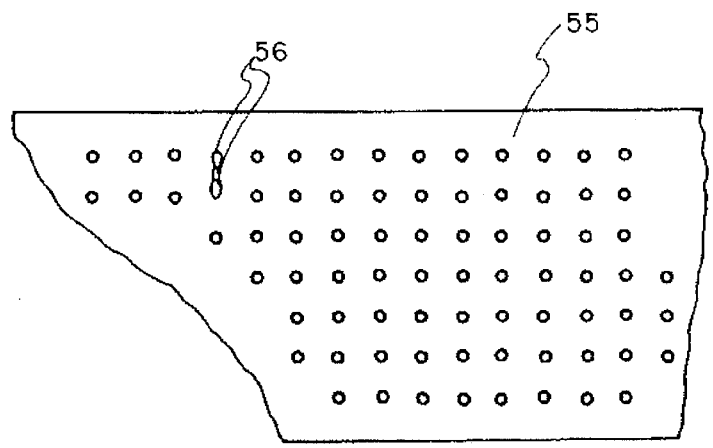
FIG. 7 is a top plan view of a claw receiving pad.
Figure 8:
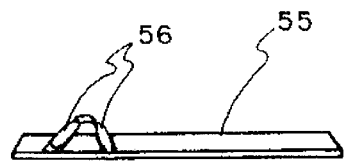
FIG. 8 is a sectional view taken through lines 8—8 of FIG. 7.

The rear of each of the crab claw carriers has an end wall 24 with forwardly rolled flanges 25 as can clearly be seen in FIG. 4.

The crab claw cutting portion 10 of the present invention includes a conveyor loading station 26, a claw cutting station 27 and a claw from waste separating station 28.

The meat extraction portion 12 includes a carrier belt loading station 29, a meat from shell separating station 30 and a claw shell waste removal station 31.

Figure 2:
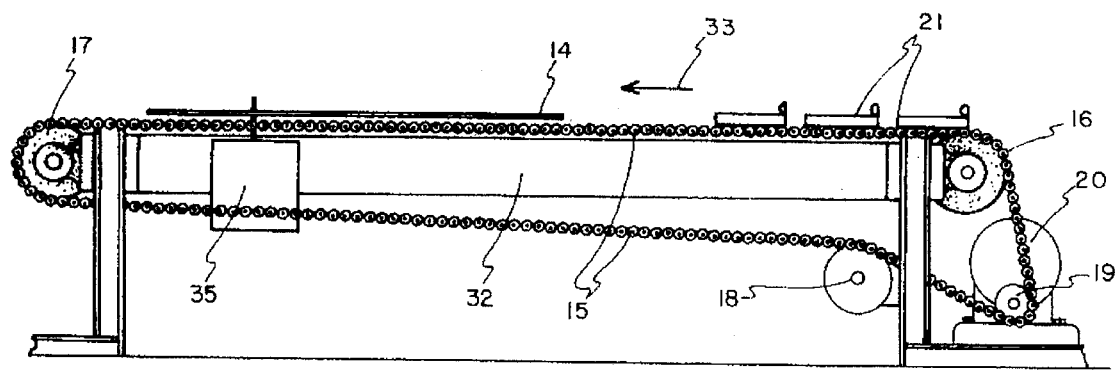
FIG. 2 is a somewhat schematic side elevational view of the crab claw conveyor along with the claw cutting means.

Disposed between conveyor chain sprockets 16 and 17 is a chain bar 32 which supports the conveyor chain 15. The conveyor chain 15 is adapted to move in the direction shown by arrow 33 in FIG. 2.

Near the end of the direction of travel of the conveyor chain 15, and in the area adjacent sprocket 17 which reverses the direction of travel of said chain, are a pair of cutting motors 34 and 35. Each of these motors has a drive shaft 34' and 35', respectively, with circularly cutting blades 36 and 37 operatively mounted thereon.

Figure 3:
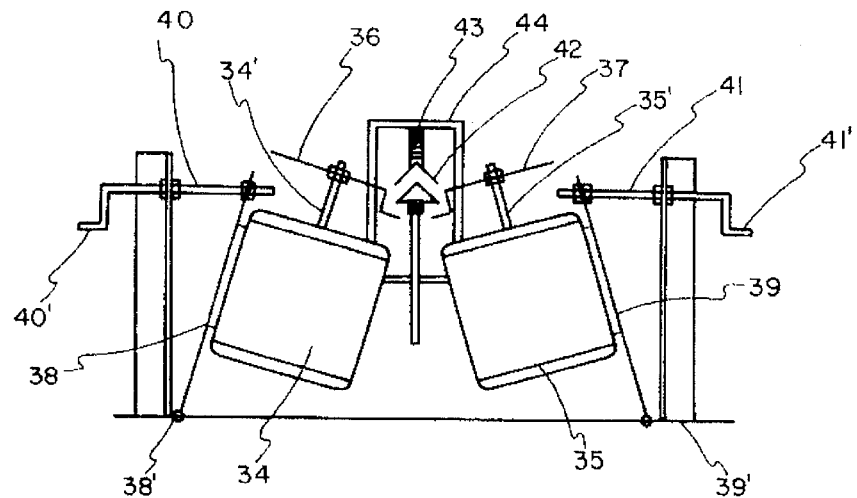
FIG. 3 is a sectional view taken through lines 3—3 of FIG. 2.

Each of the cutting motors 34 and 35 are mounted on support means 38 and 39 that are pivoted as indicated at 38' and 39'. The end of each of the support means 38 and 39, opposite their respective pivots 38' and 39', are connected to threaded jack shafts 40 and 41, respectively. When the handles 40' and 41' of the respective jack shafts 40 and 41 are manipulated, the motors 34 and 35 can be raised or lowered as can clearly be seen in FIG. 3.

An inverted V-shaped-in-cross-section crab claw holddown bar 42 is provided above the conveyor chain 15 and its associated crab claw carriers 21 in the claw cutting station 27. This hold-down bar 42 is mounted on downwardly biased springs 43 on hold-down bar frame 44. This arrangement allows the hold-down bar to hold the claws in place during the cutting operation due to the bias of springs 43 while at the same time allowing said bar to floatingly ride thereon to automatically adjust to slight changes in the size of the claws passing thereunder as will hereinafter be described in greater detail.

The common blue crab that is commercially harvested from the Gulf and Atlantic Coasts has five pairs of legs. The front pair of legs, commonly referred to as crab claws, indicated generally at 64, are pincer carrying and include a crab claw arm 45 that has a body joint end 46 with the other end connected to knuckle joint 47. The opposite side of this joint is connected to the pincer 48. The pincer includes a stationary jaw 49 and a movable jaw 50.

When the body joint 46 of the claw arm 45 and at least a portion of the jaws 49 and 50 are cut from the crab claw 64, the waste is ejected through chute 51 in the bottom of cutting station 27 into either a receptacle (not shown) or onto a cross conveyor 51' for removal. The thus cut crab arm 45 and pincer 48 with the connecting joint 47 are then dropped off the end of conveyor 14 adjacent sprocket 17 and pass out slide chute 52 onto the side trays 29' of the carrier belt loading station 29.

A relatively wide conveyor belt 53 is operatively mounted on support rollers 54 and 55. Since conveyor belts and support rollers are well known to those skilled in the art, further detailed discussion of this part of the present invention are not deemed necessary.

Spaced along and supported by conveyor belt 53 are a plurality of claw receiving pads 55. These pads can either be mounted on the conveyor belt 53 or they can be part of said belt. These pads are preferably made from neoprene or similar material and have a plurality of paired openings extending outwardly from each other at an angle that will allow the arm 45 and pincer 48 of the crab claw 64 to be inserted thereinto with the knuckle joint 47 at the apex of the openings.

The claw receiving pads of areas 55 are preferably rectangular in shape and are so sized that they fit within the shaker box 57 operatively mounted within the meat separating station 30.

Inside the shaker box 57 and above the claw receiving pads 55 is a hold-down means 59. This hold-down means can be a neoprene pad or the like that can be either inflated or lowered into contact with the crab claws 64 disposed in the slanted, paired openings 56.

A shaker means 62 is operatively attached to shaker box 57 to vibrate the same between 1,500 and 5,000 vibrations per minute to shake the crab meat from the claw arm and pincer. One method of vibrating the crab meat from the connected arm and pincer would be the vibratory apparatus disclosed in U.S. Pat. Number 4,003,103 (now expired). Other vibratory means could, of course, be used to obtain the same results.

A lateral or cross conveyor 58 can be provided under the shaker box 57 to remove the extracted crab meat to an area for packing or further processing. Cross conveyors of this type are well known to those skilled in the art and further detailed discussion of the same is not deemed necessary.

Figure 9:
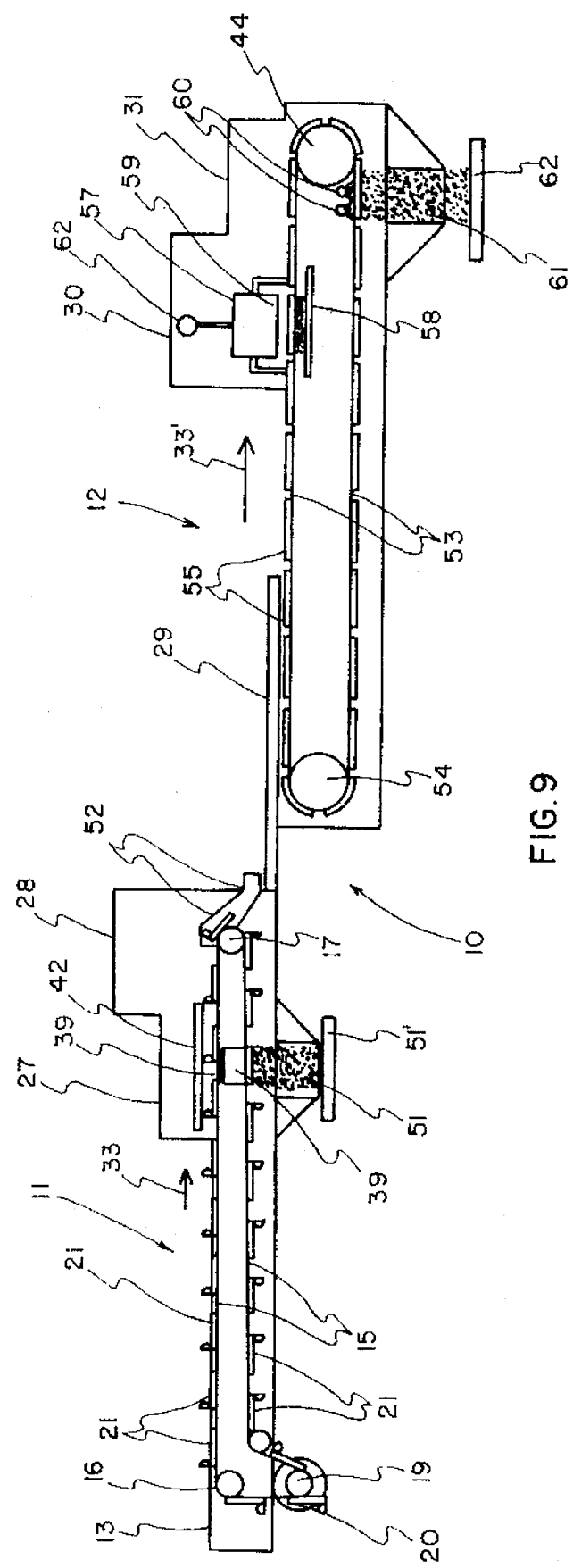
FIG. 9 is a somewhat schematic sectional view of the crab meat extracting apparatus of the present invention.

The process of removing the crab meat from the claw arm and pincer is an incremental process with the pad 55 moving in place within shaker box 57, the hold-down means 59 moving against the pad 55, the pad 55 being vibrated to remove the crab meat from the pincer and arm, and then the hold-down cushion moving out of contact with such pad and the same moving from the shaker box and the next pad moving thereinto. As this process continues each pad will move around the end support roller 54 and will be inverted as can clearly be seen on the right hand side of the sectional schematic of FIG. 9. A means is then used to remove the arm and pincer shells of the crab claws 64 from each of the pads. This can be accomplished through the use of high pressure fluids such as air or water nozzles 60 which are aimed down the bore of each of the openings 56 in pad 55. These shells will fall into chute 61 and from there onto cross conveyor 62 for removal and disposal.

When any given pad 55 moves back in place adjacent the side trays 29' of station 29, the same is ready for reloading with the trimmed crab claws 64.

The means or method of using the crab claw meat extractor of the present invention includes taking a plurality of crab claws 64, including pincers and attached arms, that have been graded to the same size and placing such graded claws on the work tables 13 of the conveyor loading station 26. Workers standing on either side thereof can then place multiple crab claws 64 on the crab claw carrier 21 mounted on the conveyor drive chain 15. When one of the crab claw carriers 21 is full then the next one is filled, etc. The crab claw conveyor 14 moves steadily in the direction of the arrow 23 and each of the claw carriers 21 passes under spring-biased hold-down bar 42 when it enters the claw cutting station 27.

The handles 40' and 41' of the respective threaded jack shafts 40 and 41 are adjusted to set the position of the respective cutting motors 34 and 35 and their associated blades 36 and 37 to the correct height for the size crab claws 64 being processed at the time.

As the claws pass through the cutting station 27, the cutting blade 36 will sever the pincer jaws 49 and 50 at the preset location and blade 37 will sever the body joint end 46 of the crab claw arm 45 opposite knuckle joint 47. The cut or waste jaws 49 and 50 and arm end 46 will drop through chute 51 and either into a receptacle (not shown) or onto a lateral conveyor 51' to remove the same for disposal.

As the crab claw carrier 21 with its associated trimmed crab claws 64 passes around sprocket 17, which is past hold-down bar 42, such crab claws will fall into slide chute 52 and be deposited on the trays 29' at the belt loading station 29.

Workers standing on either side of the side trays 29' can take the crab claws 64 and insert the claw arm in one of the paired holes 56 and the pincer in the other with the knuckle joint 47 at the top.

Once each of the pads 55 has been filled, it can be moved by conveyer 53 until it enters the meat-from-shell separating station 30. At that point the hold-down cushion 59 presses down against the pad 55 and its inserted crab claws. With the cushion in place to hold the crab claws in the holes 56 of pad 57, the shaker box is vibrated in the range of 1,500 to 5,000 vibrations per minute for a predetermined period of time until the meat within the crab claw pincer and arm has vibrated therefrom and has fallen onto lateral conveyor 58. The hold-down cushion 59 is then raised and the pad thereunder moved in the direction shown by arrow 33' a distance equal to the length of the pad so that the next pad is disposed beneath the hold-down cushion 59. The shaking process is then repeated.

As the pads 55 with their associated de-meated pincer and arm shells moves above disposal chute 61, fluid jets 60 of water, air or the like are directed down the bore of each of the angled holes 56 to remove such shells therefrom. Once the holes have been emptied, the pad above the chute will move therefrom as the shaker process is completed for subsequent pads. The cross or lateral conveyor 56 can be used to remove the empty shells for disposal.

As the empty pads 55 move around roller 54 and are again adjacent to the side trays 29' of the belt loading station 29, the workers (not shown) can again fill such pads so that the vibratory crab claw meat removal process can sequentially be continued until all the crab claws 64 have had the meat extracted therefrom.

From the above it can be seen that the present invention provides a highly efficient method of extracting the meat from crab claws including the pincer portions and arm portions thereof. The apparatus for accomplishing this operates in an endless cycle and is simple and yet highly efficient. The present invention provides a means for extracting the meat from crab claws with very little if any contamination of shells with the meat during such process.

The present invention can, of course, be carried out in other ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An apparatus for removing meat from graded crab claws having pincers with jaw ends and attached claw arms with body joint ends comprising: means for cutting the jaw ends of said crab claw pincers and the body joint ends of the attached claw arms; means for placing said crab claws in a vibrating crab meat extracting means with the cut pincer and crab arm ends disposed in a generally downwardly direction; said crab claws placing means including at least one pad having a plurality if paired openings extending outwardly and downwardly from each other at an angle that will allow the crab arms and pinchers of the crab claws to be inserted thereinto; and means for vibrating said claws to remove the meat therefrom whereby an improved crab claw meat extractor is provided.

2. The apparatus of claim 1 including a crab claw conveyor; and means for holding said claws on said conveyor prior to and during the cutting of the pincer jaws and attached claw arm joint.

3. An apparatus for removing meat from graded crab claws having pincers with jaw ends and attached claw arms with body joint ends comprising: a crab claw conveyor; means for holding said claws on said conveyor; means for cutting the ends of said crab claw jaws and attached claw arm body joint ends; means for placing said crab claws in a vibratory crab claw meat extractor with the cut pincer and claw arms disposed in a generally downwardly direction; said crab claws placing means including at least one pad having a plurality of paired openings extending outwardly and downwardly from each other at an angle that will allow the crab arms and pinchers of the crab claws to be inserted thereinto; means for vibrating said crab claws to separate the meat therefrom; and removing the separated crab meat and empty crab claws from the vibrating meat extractor whereby an improved crab claw meat extractor is provided.

4. The method of removing meat from crab claws having pincers with jaw ends and attached claw arms with body joint ends comprising: cutting the jaw ends of the pincers and the body joint ends of the attached claw arms; placing said crab claws in a vibratory crab meat extractor with the cut pincer and attached claw arms disposed in a generally downwardly direction; and vibrating said extractor to remove the crab meat from the crab claw pincers and attached claw arms.

5. The method of claim 4 wherein a conveyor means is provided for holding said crab claws prior to and during the cutting process.

6. The method of claim 4 wherein pads having paired diverging openings therein are provided for holding said cut crab claws during the vibratory extraction of meat therefrom.

7. The method of claim 6 wherein a means is provided for removing the empty crab claws from the openings in the pads after the meat has been extracted therefrom.

8. The method of claim 7 wherein the removing means is a fluid stream directed into the openings in said pads.

* * * * *